Figure 1:
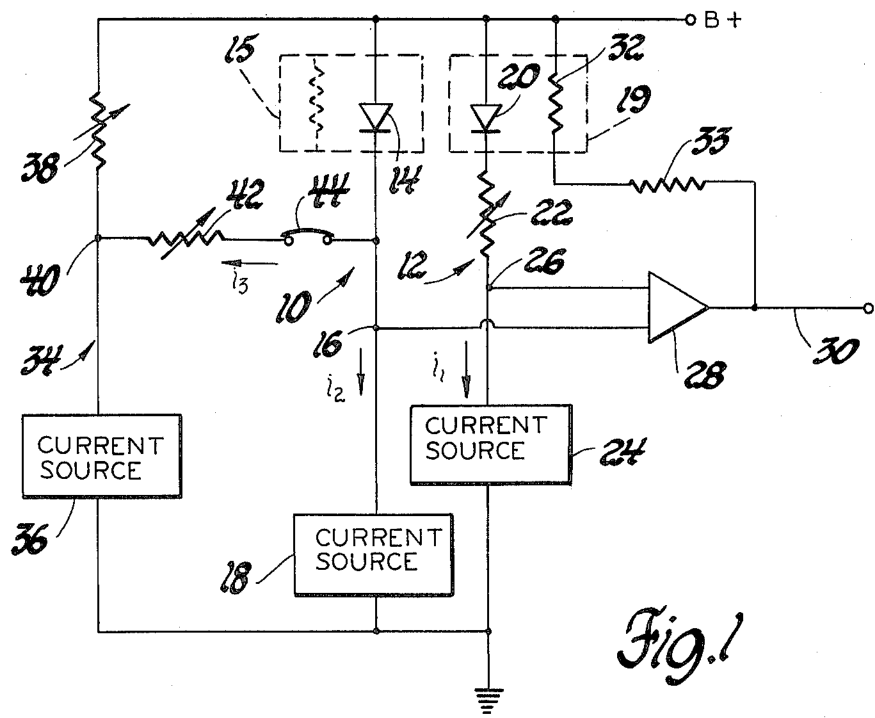

United States Patent [19]

Hopper

[11] Patent Number: 4,487,063

[45] Date of Patent: Dec. 11, 1984

[54] SOLID STATE MASS AIR FLOW SENSOR

[75] Inventor: Daniel H. Hopper, Peru, Ind.

[73] Assignee: General Motors Corporation, Detroit, Mich.

[21] Appl. No.: 512,551

[22] Filed: Jul. 11, 1983

[51] Int. Cl.[3] .......... G01F 1/68

[52] U.S. Cl. .......... 73/204

[58] Field of Search .......... 73/204; 374/173, 178

[56] References Cited

U.S. PATENT DOCUMENTS 3,988,928 11/1976 Edstrom et al. .......... 73/204

3,992,940 11/1976 Platzer, Jr. .......... 73/204

FOREIGN PATENT DOCUMENTS 56-12556 2/1981 Japan .......... 73/204

1098077 1/1968 United Kingdom .

OTHER PUBLICATIONS

Huijsing et al. "Monolithic Integrated Direction-Sensitive Flow Sensor" in IEEE Trans. on Electronic Devices, Ed-29 #1, 1/82, pp. 133-136.

*Primary Examiner*—Herbert Goldstein

*Attorney, Agent, or Firm*—Warren D. Hill

[57] ABSTRACT

A hot element anemometer uses solid state diode chips for the heated air flow sensing element and the ambient temperature sensing element in parallel circuit branches. The air flow sensing element carries a heating resistor on the diode chip. Constant current sources of equal value supply current through the diodes. The air flow sensor diode is in series with a resistor which determines the nominal temperature difference between the diode chips. A circuit compares voltages in the two diode branches and provides an air flow output signal and controls the temperature of the air flow sensor diode. To compensate for changes of thermal conductivity of the air temperature and various temperature effects in the circuit, a third current source is coupled to the ambient temperature sensing branch through a resistor network and includes resistors that can be adjusted to provide a functional calibration which yields an air flow signal free of linear temperature effects.

3 Claims, 2 Drawing Figures

B+
15
20
32
19
33
38
42
44
14
22
40
12
26
$i_3$
10
16
34
$i_1$
$i_2$
28
30
CURRENT SOURCE
CURRENT SOURCE
24
36
CURRENT SOURCE
18

SOLID STATE MASS AIR FLOW SENSOR

This invention relates to a mass air flow sensor circuit using solid state sensors and, particularly, to such a circuit suited for functional temperature compensation calibration.

It has previously been proposed to measure mass air flow by hot element anemometry where the hot element is in the form of a wire, a foil or a solid state integrated circuit. In each case, special circuitry is required to compensate for temperature effects on the measurement. Temperature variations are primarily due to the changing thermal conductivity of the air with temperature, but additional temperature effects arise from many sources within the circuit itself. It is desirable then to have a mass air flow sensing circuit which provides accurate and reliable results independently of air temperature. This is an especially important feature in the case of a circuit for measuring the induction flow to an internal combustion engine in an automotive vehicle which is subject to extreme ranges of temperature and requires accurate mass air flow readings for use in fuel control applications.

It is therefore an object of this invention to provide an air flow measuring circuit with solid state sensors and the capability of functional temperature compensation adjustment. It is another object of the invention to provide such an air flow measurement circuit where the functional calibration can be carried out simply and requires no critical temperature controls. A further object of the invention is to provide such an air flow measuring circuit which compensates for various temperature effects of the circuit as well as the varying thermal conductivity of air.

The invention is carried out by providing an air flow measuring circuit using solid state sensors for ambient air temperature and for the heated mass air flow sensor, a current source in series with each sensor, a resistor in series with the air flow sensor, a comparator responsive to voltages developed across the sensors and resistor to provide both an output signal and a control for the temperature of air flow sensor, and a calibration network including a third current source resistively coupled to one of the sensors to allow functional adjustment of the sensor current to compensate for the effects of temperature variations.

Figure 2:
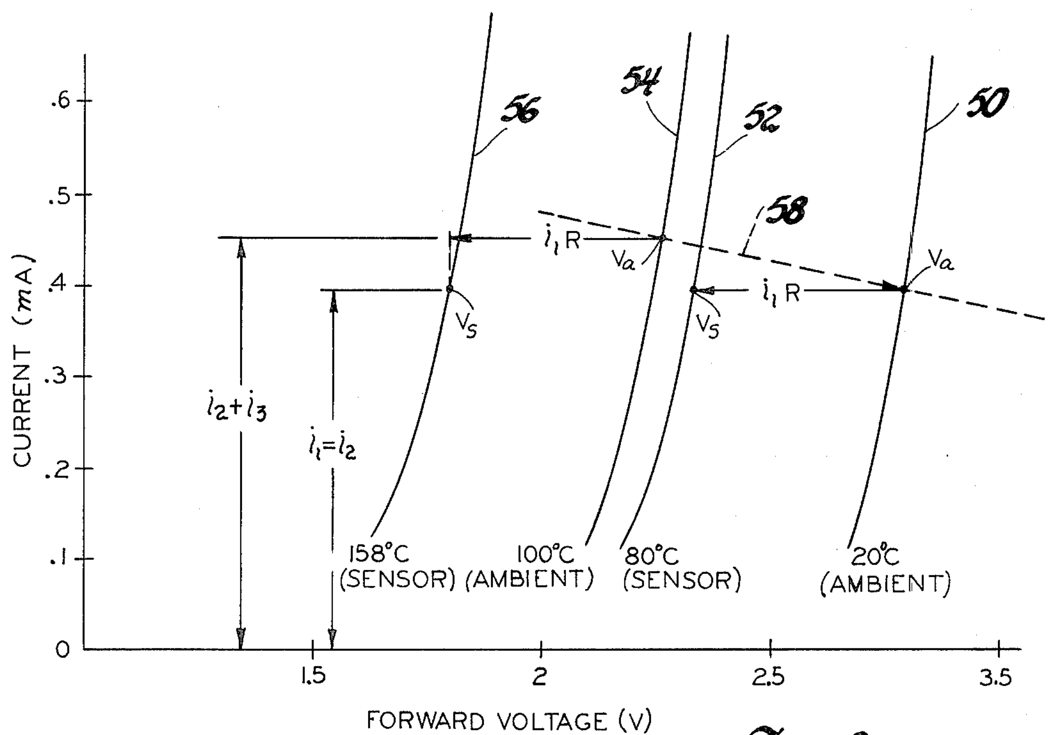

The above and other advantages will become more apparent from the following description taken in conjunction with the accompanying drawings wherein:

FIG. 1 is a schematic diagram of the air flow measuring circuit according to the invention; and FIG. 2 is a diagram of diode characteristics illustrating the effects of functional calibration according to the invention.

Hot element anemometry requires two sensors, one of which is responsive to the ambient air temperature and the other of which is heated to some specified temperature above ambient and measures the mass air flow rate in accordance with the amount of power input required to maintain the sensor at a determined temperature increment above the ambient temperature. It is desirable then for these two sensors to have similar characteristics so that they will behave similarly in widely different temperature ranges. The well developed silicon integrated circuit technology provides temperature sensitive elements which can be used for ambient temperature sensors as well as for air flow sensors. Specifically, silicon diodes have a very linear voltage change with temperature at a given current, and such diodes are readily produced with matching characteristics. For this application, it is preferred to use silicon IC chips with four diodes in series and a heater resistor thermally coupled with the diodes but electrically isolated therefrom. When used as an air flow sensor, the heating resistor is connected in a control circuit to elevate the temperature of the diodes. A similar chip is used as the ambient temperature sensor, but the resistor on the chip remains inactive, that is, it is not coupled to a circuit so that the diodes will assume the ambient air temperature.

Referring to FIG. 1, the mass air flow sensor circuit comprises an ambient temperature branch 10 and an air flow branch 12, each connected between a voltage supply B+ and ground. The branch 10 comprises a silicon diode 14 on a chip 15 wherein the four diodes in series are represented in the drawing as a single diode and are referred to herein as a "diode" or "diode sensor". The heating resistor on chip 15 is inactive so that the diode 14 serves as an ambient air temperature sensor. The diode 14 is serially connected at a junction point 16 with a constant current source 18. The air flow branch 12 includes a chip 19 substantially identical to the chip 15 with a diode 20 serving as the air flow sensor and with its resistor heater 32 connected in circuit so that its temperature can be elevated above that of the ambient air. The diode 20 is serially connected with an adjustable resistor 22 and a constant current source 24 which is connected to the resistor 22 at a junction 26. Preferably, the current source 24 has the same current rating as the current source 18. An operational amplifier 28 with its inputs connected to the junction points 16 and 12 compares the junction point voltages and produces an output on line 30 which is a voltage signal representative of the mass air flow rate. The resistor heater 32 on the diode chip 19 is connected at one end to B+ and at the other end through series resistor 33 to the output 30 so that the operational amplifier 28 controls the power supplied to the resistor heater 32. It is desirable for the power in the resistor heater 32 to be only a function of the output on line 30, independent of temperature changes. The series resistor 33 is made equal in value to the nominal value of the resistor heater to minimize power variations due to the temperature co-efficient of resistance of the resistor heater 32. The voltage drop across the ambient diode sensor 14 is compared to the drop across the air flow diode sensor 20 and the resistor 22, and the current flow through the resistor heater 32 is adjusted until those voltage drops are balanced. Since the diodes have essentially the same characteristics if the resistor 22 were not present, the voltage drops would have the same value at the same temperature, assuming equal current flows. Thus, the presence of the resistor 22 requires a diode temperature differential to balance the voltage drops and the resistor value determines the nominal temperature difference of the two sensors.

A third circuit branch 34 of the sensor circuit is provided for temperature compensation and includes a third constant current source 36 and an adjustable offset resistor 38 which are serially connected between B+ and ground. The junction point 40 of the current source 36 and resistor 38 is connected through an adjustable gain resistor 42 and a normally closed jumper 44 to the junction point 16 on the ambient temperature branch 10. Thus, the resistors 38 and 42 can be adjusted to allow calibration of current flow through the resistor 42 thereby altering the current flow in the ambient diode sensor 14.

Preferred components include small area silicon diodes to make up the diode sensors, constant current sources 18 and 24 rated at 0.4 mA, current source 36 rated at 0.8 mA, and thick film resistors 22, 38 and 42 at nominal values of 1.0, 2.8 and 4k ohms, respectively, and laser trimmed to higher values for circuit calibration.

To analyze the circuit, let the current through the current source 24 be $i_1$, the current through the current source 18 be $i_2$ and let the current flowing through the gain resistor 42 toward junction point 40 be $i_3$ as indicated by the arrows. With the air flow diode sensor 20 heated such that the voltage at junction point 26 equals that at point 16, then $V_a$ equals $V_s+i_1R$ where $V_a$ is the voltage drop across the ambient sensor 14, $V_s$ is the voltage drop across the air flow sensor 20 and R is the resistance of the resistor 22.

The diode characteristics are shown in FIG. 2 which is a graph of the diode current versus the diode forward voltage where each curve represents a diode characteristic at a given temperature and refers to either sensor since the diode characteristics are the same. The diodes are operated in a range where diode currents are much greater than any leakage currents but small enough to produce negligible heating of the diodes. For a given diode current, the characteristic voltage decreases essentially linearly with increase of temperature. Thus, the four curves 50, 52, 54 and 56 represent the diode characteristic for the temperature 20° C., 80° C., 100° C. and 158° C. as labeled. FIG. 2 illustrates the system operation for the preferred case where $i_1=i_2$, the current $i_3=0$ when the ambient temperature is 20° C. and the nominal temperature difference between the ambient sensor and the air flow sensor is 60° C. The curve 50 then applies to the ambient temperature sensor 14 when the ambient temperature is 20° C., and the curve 52 applies to the air flow sensor 20 which will then be at 80° C. The chosen currents $i_1$ and $i_2$ define the voltage drop $V_a$ on curve 50 and the voltage drop $V_s$ on curve 52. Since $V_a=V_s+i_1R$, the horizontal distance between the points $V_s$ and $V_a$ represents $i_1R$. This illustrates the point that for a given current the resistance R determines the temperature difference between the two sensors.

Because the thermal conductivity of the air increases at higher temperature, it is customary to decrease the sensor temperature difference for higher temperatures to compensate for the change in thermal conductivity. Thus, as illustrated by the curves 54 and 56, if the temperature of the ambient sensor is 100° C., then the temperature of the air flow sensor is on the order of 158° C., or two degrees less than if a strict 60° C. temperature difference were adhered to. By introducing the current $i_3$ at temperatures other than 20° C. ambient, the voltage drop $V_a$ moves along the characteristics of the diode 14 and, as shown in curve 54, the point $V_a$ is higher and further to the right than it would be if $i_3$ were 0. Then, since $i_1$ is a constant value, the horizontal distance $i_1R$ between $V_a$ and $V_s$ is constant and the air flow sensor chip is heated to position the curve 56 where the point $V_s$ is at the fixed distance $i_1R$ from the point $V_a$ and that occurs when the temperature is about 58° C. higher than ambient. That temperature adjustment compensates not only for the effects of the changing thermal conductivity of the air, but also incorporates various other temperature effects arising from a number of sources within the circuit itself. It should be noted that as the ambient temperature increases and the voltage drop $V_a$ at a given current decreases, the potential at point 16 tends to increase so that the current $i_3$ will also tend to increase by an amount proportional to the temperature change. Thus, as indicated in FIG. 2, the potential $V_a$ moves along a load line 58.

Calibration of the circuit is necessary to set the nominal voltage difference between the two sensors and to set the offset and slope of the load line 58. The mass air flow sensing circuit according to this invention requires no exact knowledge of the sensor characteristics, but rather relies on a functional calibration test to establish the temperature characteristics. The calibration test requires a known mass air flow rate at two different temperatures. The temperatures do not have to be precisely controlled. It is important, however, for the air flow rate to be accurate. The calibration procedure is first to flow test the sensor at 20° C., or room temperature with the jumper 44 open. The resistor 22 is trimmed to set a predetermined output voltage on line 30 corresponding to that air flow, and the offset resistor 38 is trimmed to establish 0 volts across the junction points 16 and 40. This will establish the offset or pivot point of the ambient load line 58 at point $V_a$ on curve 50 in FIG. 2. Second, the sensor is flow tested at a high temperature, say 100° C., at the same air flow as in the first test with the jumper 44 closed. The gain resistor 42 is trimmed to produce the same output signal voltage on line 30 as in the first test. This establishes the slope of the ambient load line 58 and takes into account all temperature effects of the sensors and the circuit at the test points. To the extent that any temperature effect in the circuit is linear, the circuit is then fully compensated for all such effects.

It will thus be seen that the circuit according to this invention is of very simple configuration and when calibrated according to a simple flow test and resistor trimming procedure it is temperature compensated for a wide range of temperature variations.

The embodiments of the invention in which an exclusive property or privilege is claimed are defined as follows:

1. A mass air flow sensing circuit having solid state flow sensing and temperature compensation elements subject to effects of an airstream being measured and each having a voltage drop dependent on its temperature and the current flow therethrough, comprising;

a first solid state element thermally coupled to heater means for heating to a controlled temperature, a first resistor and a first constant current source in series with the first element, a second solid state element in series with a second constant current source, the second element being maintained at the ambient temperature of the airstream, means for comparing the voltage drop across the serial combination of the first element and first resistor with the voltage drop across the second element to provide an output signal and to equalize the voltage drops by energizing the heater means to control the voltage drop across the first element, whereby the output signal for a given air flow and the nominal temperature difference between the first and second elements are determined by the value of the first resistor, and means for adjusting the said temperature difference to compensate for temperature effects of the air and the sensing circuit comprising current altering means coupled to one of the elements or first resistor for altering the said temperature difference as ambient air temperature varies.

2. A mass air flow sensing circuit having solid state flow sensing and compensation elements subject to mass flow rate and temperature effects of an airstream being measured and each including diode means having a voltage drop which decreases with increasing temperature and increases with the current flow therethrough, comprising;

first diode means thermally coupled to heater means for heating to a controlled temperature, a first resistor and a first constant current source in series with the first diode means, second diode means in series with a second constant current source, the second diode means being maintained at the ambient temperature of the airstream, means for comparing the voltage drop across the serial combination of the first diode means and first resistor with the voltage drop across the second diode means to provide an output signal and to equalize the voltage drops by energizing the heater means to control the voltage drop across the first diode means, whereby the output signal for a given air flow and the nominal temperature difference between the first and second elements are determined by the value of the first resistor, and means for adjusting the temperature difference to compensate for temperature effects of the air and the sensing circuit comprising a third constant current source coupled to the second diode means by resistor means for altering the temperature difference as ambient air temperature varies.

3. A mass air flow sensing circuit having solid state flow sensing and compensation elements subject to mass flow rate and temperature effects of an airstream being measured and including substantially matched diode means each having a voltage drop which decreases with increasing temperature and increases with the current flow therethrough, comprising;

first diode means in series with a first resistor and a first constant current source, the series circuit being connected across a voltage supply, the first diode means being thermally coupled to heater means for heating to a controlled temperature, second diode means serially connected at a junction point with a second constant current source and both connected across the voltage supply, the second element being maintained at the ambient temperature of the airstream, means for comparing the voltage drop across the serial combination of the first diode means and first resistor with the voltage drop across the second diode means to provide an output signal and to equalize the voltage drops by energizing the heater means to control the voltage drop across the first diode means, whereby the output signal for a given air flow and the nominal temperature difference between the first and second elements are determined by the value of the first resistor, and means for adjusting the temperature difference to compensate for changing thermal conductivity of the air and temperature effects of the sensing circuit comprising a third constant current source and an offset resistor connected at a junction point in series across the voltage supply, and a gain resistor connected between the junction points, the offset resistor being adjusted at a low test temperature to obtain equal potential at the two junction points, and the gain resistor being adjusted at a high test temperature to obtain the same output signal for a given air flow as at the low test temperature.

* * * * *